United States Patent
Nagel et al.

(10) Patent No.: US 10,077,700 B2
(45) Date of Patent: Sep. 18, 2018

(54) METHOD FOR CHECKING THE PLAUSIBILITY OF A NOX SENSOR IN AN SCR CATALYTIC CONVERTER SYSTEM

(71) Applicant: Robert Bosch GmbH, Stuttgart (DE)

(72) Inventors: Cornelia Nagel, Stuttgart (DE); Alexander Franz, Gaertringen (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 15/346,227

(22) Filed: Nov. 8, 2016

(65) Prior Publication Data

US 2017/0130629 A1  May 11, 2017

(30) Foreign Application Priority Data

Nov. 11, 2015 (DE) .................. 10 2015 222 209

(51) Int. Cl.
| | |
|---|---|
| *F01N 11/00* | (2006.01) |
| *F01N 3/20* | (2006.01) |
| *F01N 9/00* | (2006.01) |
| *F01N 3/035* | (2006.01) |
| *F01N 13/00* | (2010.01) |

(52) U.S. Cl.
CPC ............ *F01N 3/208* (2013.01); *F01N 3/035* (2013.01); *F01N 3/2066* (2013.01); *F01N 9/007* (2013.01); *F01N 11/00* (2013.01); *F01N 13/0093* (2014.06); *F01N 2550/00* (2013.01); *F01N 2560/026* (2013.01); *F01N 2900/1812* (2013.01); *Y02T 10/24* (2013.01); *Y02T 10/47* (2013.01)

(58) Field of Classification Search
CPC ............ F01N 3/206; F01N 2560/026; F01N 2900/0416; F02D 41/222
See application file for complete search history.

(56) References Cited

U.S. PATENT DOCUMENTS

2014/0147355 A1   5/2014 Fritsch et al.
2018/0003098 A1*  1/2018 Osburn ................. F01N 3/2066

FOREIGN PATENT DOCUMENTS

| DE | 102012221905 | 6/2014 | |
|---|---|---|---|
| DE | 102013203580 | 9/2014 | |
| JP | 2012107536 A * | 6/2012 | ............. F01N 3/208 |

* cited by examiner

*Primary Examiner* — Jonathan Matthias
(74) *Attorney, Agent, or Firm* — Michael Best & Friedrich LLP

(57) ABSTRACT

In the case of a method for checking the plausibility of a NOx sensor (62; 63) in an SCR catalytic converter system having at least one first SCR catalytic converter device (20) and having at least one second SCR catalytic converter device (30) and having in each case one dosing point (40, 50) for a reducing agent solution for the SCR catalytic converter devices (20, 30) upstream of the respective SCR catalytic converter device, the NOx sensor (62) to be checked for plausibility is situated either between the first SCR catalytic converter device (20) and the second SCR catalytic converter device (30), or the NOx sensor (63) to be checked for plausibility is situated downstream of the second SCR catalytic converter device (30).

12 Claims, 2 Drawing Sheets

METHOD FOR CHECKING THE PLAUSIBILITY OF A NOX SENSOR IN AN SCR CATALYTIC CONVERTER SYSTEM

BACKGROUND OF THE INVENTION

The present invention relates to a method for checking the plausibility of a NOx sensor in an SCR catalytic converter system having at least one first SCR catalytic converter device and having at least one second SCR catalytic converter device and having in each case one dosing point for a reducing agent solution for the SCR catalytic converter devices upstream of the respective SCR catalytic converter device. The invention also relates to a computer program, to a machine-readable storage medium, and to an electronic control unit, which are provided for carrying out the plausibility checking method.

To comply with the legally prescribed exhaust-gas limit values during the operation of motor vehicles, complex exhaust-gas aftertreatment systems are used. More stringent regulations in the field of the diagnosis of emissions-relevant components necessitate, in the context of so-called on-board diagnosis (OBD), monitoring of all exhaust-gas aftertreatment components and of the sensors used with regard to compliance with the OBD limit values.

For the reduction of nitrogen oxides (NOx), SCR (Selective Catalytic Reduction) catalytic converters are known. The basic principle of the SCR catalytic converter consists in nitrogen oxide molecules being reduced on the catalytic converter surface, in the presence of ammonia ($NH_3$) as reducing agent, to form elementary nitrogen. SCR catalytic converters that are known nowadays store $NH_3$ on the catalytic converter surface. The $NH_3$ stored on the catalytic converter surface is described as the $NH_3$ fill level. DE 10 2012 201 749 A1 has disclosed a method for the diagnosis of the $NH_3$ storage capacity of the SCR catalytic converter as a feature for the aging of or damage to the catalytic converter, wherein, prior to the start of the diagnosis or of an overdosing phase (superstoichiometric reducing agent dosing), conditioning of the SCR catalytic converter is performed in order to set a working point in the form of a certain $NH_3$ fill level as a starting point for the diagnosis.

To attain higher conversion rates in the nitrogen oxide reduction in the exhaust tract, systems are already known which comprise two separate SCR catalytic converter devices connected in series. The laid-open specifications DE 10 2013 203 580 A1 and DE 10 2012 221 905 A1 are concerned with operating methods for exhaust-gas aftertreatment systems with two SCR catalytic converter devices.

SUMMARY OF THE INVENTION

The present invention provides a method for checking the plausibility of a NOx sensor, whereby the signals of the respective NOx sensor can be checked for plausibility in particular at the start of an SCR OBD check. Here, the plausibility checking method according to the invention may be performed in particular in conjunction with so-called active SCR diagnosis, in the case of which interventions are made into the dosing strategy. The plausibility checking method according to the invention in this case assumes an SCR catalytic converter system with at least one first SCR catalytic converter device and at least one second SCR catalytic converter device. Here, the first SCR catalytic converter device is situated closer to the internal combustion engine than the second SCR catalytic converter device. The two SCR catalytic converter devices are connected in series. Each SCR catalytic converter device is assigned in each case one dosing point for the required reducing agent solution, that is to say a dosing point for the reducing agent solution is provided more or less directly upstream of the respective SCR catalytic converter device. The NOx sensor to be checked for plausibility is assigned to one of the two SCR catalytic converter devices, wherein the NOx sensor to be checked for plausibility is situated more or less directly downstream of the respective SCR catalytic converter device. The NOx sensor to be checked for plausibility may thus be situated, in a first case, between the first SCR catalytic converter device and the second SCR catalytic converter device and, in a second case, downstream of the second SCR catalytic converter device. For the plausibility check according to the invention, a phase with predefinable substoichiometric dosing of the reducing agent solution is performed for the first SCR catalytic converter device or for the second SCR catalytic converter device, wherein the NOx sensor arranged respectively downstream is to be checked for plausibility. The measurable signal values of the NOx sensor arranged respectively downstream are compared with calculable or modellable signal values in the case of NOx conversion that is to be expected in the first or in the second SCR catalytic converter device. Here, the expression "NOx conversion" is to be understood as referring to a variable that represents the NOx conversion, for example the NOx conversion rate. In the event of a deviation allowing for predefinable tolerances, it is inferred that the respective NOx sensor is implausible.

Present SCR systems have at least one NOx sensor downstream of the SCR catalytic converter. Presently used NOx sensors often exhibit cross-sensitivity with respect to $NH_3$, such that the sensor signal indicates a summed signal of NOx and $NH_3$. An increase in the signal of a NOx sensor arranged downstream of an SCR catalytic converter may thus be indicative both of a falling NOx conversion rate, that is to say an increase of the NOx concentration, and of a breakthrough of pure ammonia, that is to say an increase of the $NH_3$ concentration. A direct distinction between NOx and $NH_3$ is not possible. In particular in the case of such sensors, the plausibility check according to the invention is highly advantageous in order to avoid incorrect error messages.

The plausibility checking method according to the invention is particularly advantageously suitable for checking the plausibility of that NOx sensor which is assigned to the first SCR catalytic converter device and which is situated between the first and the second SCR catalytic converter device, that is to say downstream of the first SCR catalytic converter device and at the same time upstream of the second SCR catalytic converter device. The substoichiometric dosing of the reducing agent solution is established at the dosing point for the first SCR catalytic converter device, and the measurable signal values of the NOx sensor are compared with calculable or modellable signal values in the case of NOx conversion that is to be expected in the first SCR catalytic converter device, or with corresponding variables which represent the NOx conversion that is to be expected or the NOx conversion rate that is to be expected. The particular advantage here lies in the fact that, during the underdosing phase at the first SCR catalytic converter device, the second SCR catalytic converter device can perform the conversion of those nitrogen oxides which are not converted in the first SCR catalytic converter device, such that undesired influencing of emissions by the substoichiometric reducing agent dosing at the first SCR catalytic converter device can be reduced or eliminated entirely.

In a preferred refinement of the method according to the invention, the substoichiometric dosing is described as a dosing quantity ratio α, wherein the dosing quantity ratio α describes the ratio of the presently dosed $NH_3$ quantity to the $NH_3$ quantity that would be required for complete NOx conversion. The calculable or modellable signal values for the NOx sensor downstream of the first SCR catalytic converter device (NOx_downstreamofSCR1) or in the case of the NOx sensor (NOx_downstreamofSCR2) assigned to the second SCR catalytic converter device can be derived from a relationship between the dosing quantity ratio α and the NOx conversion ($\eta$_SCR1 or $\eta$_SCR2 respectively, $\eta$ representing by the NOx conversion rate that is to be expected) that is to be expected at the present operating point of the first SCR catalytic converter device or of the second SCR catalytic converter device respectively. The calculable or modellable signal values (NOx_downstreamofSCR1 or NOx_downstreamofSCR2 respectively) can preferably be derived, taking into consideration measurable or modellable NOx data upstream of the first SCR catalytic converter device (NOx_upstreamofSCR1) or of the second SCR catalytic converter device (NOx_upstreamofSCR2) respectively, from the following relationship:

$$NOx\_downstreamofSCR1 = NOx\_upstreamofSCR1 \cdot \alpha$$
$$\approx NOx\_upstreamofSCR1 \cdot \eta\_SCR1$$

or $$NOx\_downstreamofSCR2 = NOx\_upstreamofSCR2 \cdot \alpha$$
$$\approx NOx\_upstreamofSCR2 \cdot \eta\_SCR2$$

respectively.

This relationship can be applied in particular if no stored $NH_3$ is present in the SCR catalytic converter device or in the presence of steady-state operation. If the measured NOx signal of the NOx sensor assigned to the first SCR catalytic converter device or of the NOx sensor assigned to the second SCR catalytic converter device respectively does not correspond to the model value NOx_downstreamofSCR1 or NOx_downstreamofSCR2 respectively that is calculated in this way, the measurement signal is not plausible, wherein it is expediently the case that suitable tolerances are allowed for here.

The checking of the plausibility of the NOx sensor according to the invention is particularly preferably performed as part of a monitoring function for the $NH_3$ storage capacity of the first SCR catalytic converter device or of the second SCR catalytic converter device respectively. Here, it is particularly advantageously the case that a conditioning phase is utilized in the monitoring function for the purposes of the plausibility check according to the invention, wherein, during the conditioning phase, by way of temporary substoichiometric dosing of the reducing agent, a defined starting point for the diagnosis is set in the form of a certain $NH_3$ fill level of the respective SCR catalytic converter device. Said phase with the underdosing is utilized according to the invention for the checking of the plausibility of the respective NOx sensor in the manner described above. If, in this context, it is inferred that the NOx sensor is implausible, it is advantageously the case that the further monitoring function for the respective SCR catalytic converter device is terminated, because further diagnosis of the SCR catalytic converter device is generally no longer expedient under these circumstances.

In a particularly preferred refinement, the method according to the invention is performed as part of a monitoring function for the $NH_3$ storage capacity of the respective SCR catalytic converter device, wherein said monitoring function comprises the following phases:

conditioning phase with substoichiometric dosing for the purposes of setting a defined working point of the first SCR catalytic converter device or of the second SCR catalytic converter device respectively, overdosing phase until the maximum $NH_3$ storage of the first SCR catalytic converter device or of the second SCR catalytic converter device respectively is reached, possible emptying phase with dosing reduced or stopped, and analysis of the NOx conversion rate for the purposes of checking the $NH_3$ storage capacity of the respective SCR catalytic converter device, wherein the checking according to the invention of the plausibility of the NOx sensor assigned to the respective SCR catalytic converter device is performed during the initial conditioning phase (underdosing) in the manner described above.

The plausibility checking method according to the invention may be used particularly advantageously for SCR catalytic converter systems in which the first SCR catalytic converter device is a particle filter with SCR coating and the second SCR catalytic converter device is a conventional SCR catalytic converter. The method according to the invention is however not restricted to such SCR catalytic converter systems. Said method may for example also be used for two conventional SCR catalytic converters arranged in series.

It is preferably the case that, before the plausibility check, it is checked whether operating conditions suitable for a plausibility check are present. Here, consideration may be given in particular to system variables such as the exhaust-gas mass flow, the exhaust-gas speed, the exhaust-gas temperature, the exhaust-gas recirculation rate, the dynamics of the NOx concentration or the dynamics of the exhaust-gas mass flow and the like. It is furthermore advantageous for other operating conditions, the operational readiness and the tolerance characteristics of the respective NOx sensor to also be taken into consideration.

The comparison of the measurable signal values of the respective NOx sensor with the calculable or modellable signal values in the case of the NOx conversion or NOx conversion rate that is to be expected in the first or the second SCR catalytic converter device may be performed in particular on the basis of absolute and/or relative deviations between the measurable signal values and the calculable or modellable signal values. For the comparison of the NOx sensor values with the modelled or calculated values, consideration may for example easily be given to the difference between the NOx sensor signal and the model value, wherein a tolerable difference may be predefined. If said tolerable difference is exceeded, it can be inferred that a sensor signal is implausible. Furthermore, the comparison may for example also be performed on the basis of integrals with respect to time of the variables considered, wherein, for comparison and evaluation of the profile with respect to time of the NOx sensor signal and of the model value, the integrals with respect to time of the corresponding variables may be calculated. Furthermore, an integration of the relative deviation of measurement values and model values is also possible. The evaluation of the respective NOx sensor or of the signal values thereof may then be performed for example by way of a comparison of the result of the integration with a predefinable threshold value. The comparison between measurement value and model value or of the integrals thereof may for example also be performed on the basis of the determination of correlation coefficients. For example, if a correlation coefficient relating to magnitude lies below a predefinable threshold value, the signal of the NOx sensor can be evaluated as no longer being plausible.

If the method according to the invention is used for checking the plausibility of the NOx sensor assigned to the second SCR catalytic converter device (second NOx sensor), it is preferably the case that operation for full NOx conversion is performed for the first SCR catalytic converter device, wherein this is to be understood to mean the operating mode of the dosing device (dosing point) with normal closed-loop control. Here, this operating mode is delimited with respect to the operating mode with open-loop control, with α<1. The defined substoichiometric dosing of the reducing agent solution at the dosing point for the second SCR catalytic converter device is realized by virtue of the dosing for the second SCR catalytic converter device being stopped. For the checking of the plausibility of the NOx sensor assigned to the second SCR catalytic converter device, use is in this case expediently made of that point in time at which the first SCR catalytic converter device can bear the full emissions load on its own, and the desired overall efficiency can be realized by the first SCR catalytic converter device on its own. This has the advantage that, as a result of the emptying of the second SCR catalytic converter device, there is no influence on NOx emissions to the outside. Here, the plausibility checking method is preferably performed when it is to be assumed that no stored $NH_3$ is present in the second SCR catalytic converter device, or that the $NH_3$ fill level in the second SCR catalytic converter device is very low. Here, the calculable or modellable signal values for the NOx concentration downstream of the second SCR catalytic converter device (NOx_downstreamofSCR2) can be derived in particular from the following relationship:

NOx_downstreamofSCR2=NOx_downstreamofSCR1

In the case of plausibility, when dosing for the second SCR catalytic converter device is deactivated, and in particular when there is no stored $NH_3$ in the second SCR catalytic converter device, the downstream NOx sensor (second NOx sensor) should, allowing for the sensor tolerances, measure exactly the same amount of NOx in the exhaust gas downstream of the second SCR catalytic converter device (NOx_downstreamofSCR2) as the NOx sensor (first NOx sensor) upstream of the second SCR catalytic converter device and downstream of the first SCR catalytic converter device (NOx_downstreamofSCR1). For example, in the case of NOx conversion across the first SCR catalytic converter of 100%, the two NOx sensors should in this case measure zero. If the signal of the second NOx sensor indicates a different value (allowing for sensor tolerances) than the first NOx sensor during the course of the plausibility check according to the invention, the signal of the second NOx sensor can no longer be readily used for monitoring of the second SCR catalytic converter device. It is then expediently the case that the further diagnosis of the second SCR catalytic converter device is terminated, and/or further steps may be initiated for the diagnosis of said NOx sensor, for example an offset correction or the like, or further steps may be initiated for the compensation of the erroneous signal.

For this variant of the method according to the invention, it is expediently the case that the normal fill level closed-loop control (operation with closed-loop control) is established at the dosing point for the first SCR catalytic converter device, and the dosing is deactivated for the second SCR catalytic converter device. Both the first and the second SCR catalytic converter device should exhibit steady-state conversion, wherein the NOx conversion rate in the first SCR catalytic converter device reaches the maximum possible NOx conversion, and the NOx conversion rate in the second SCR catalytic converter device should, in the case of plausibility, be zero.

In a preferred refinement of the plausibility checking method according to the invention, the method is used for a quick test of the SCR system. Here, the checking of the plausibility of the respective NOx sensor may be utilized as a starting point for evaluating the entire SCR system for example in the context of fault finding in the workshop or in the case of a guided diagnosis of the SCR system as a whole. If, as the plausibility checking method is carried out, it emerges that the NOx sensor being checked outputs a plausible and thus valid signal, it is under some circumstances possible for fault-free functionality of the SCR system as a whole (dosing valve, quality of the reducing agent, conversion rate of the SCR catalytic converters etc.) to be directly inferred from this. On the other hand, a NOx signal evaluated as being implausible by way of the method according to the invention may be a first indication that a fault could be present at some location in the SCR system.

The invention also encompasses a computer program which is set up for carrying out the steps of the described plausibility checking method. The invention also encompasses a machine-readable storage medium on which a computer program of said type is stored, and an electronic control unit which is set up for carrying out the steps of the method. The realization of the plausibility checking method according to the invention as a computer program or as a machine-readable storage medium or as an electronic control unit has the particular advantage that the plausibility checking method according to the invention can then also for example be used in existing motor vehicles which have a corresponding SCR catalytic converter system with two SCR catalytic converter devices.

BRIEF DESCRIPTION OF THE DRAWINGS

Further features and advantages of the invention will emerge from the following description of exemplary embodiments in conjunction with the drawings. Here, the individual features may be realized in each case individually or in combination with one another. In the drawings.

DETAILED DESCRIPTION

Figure 1:
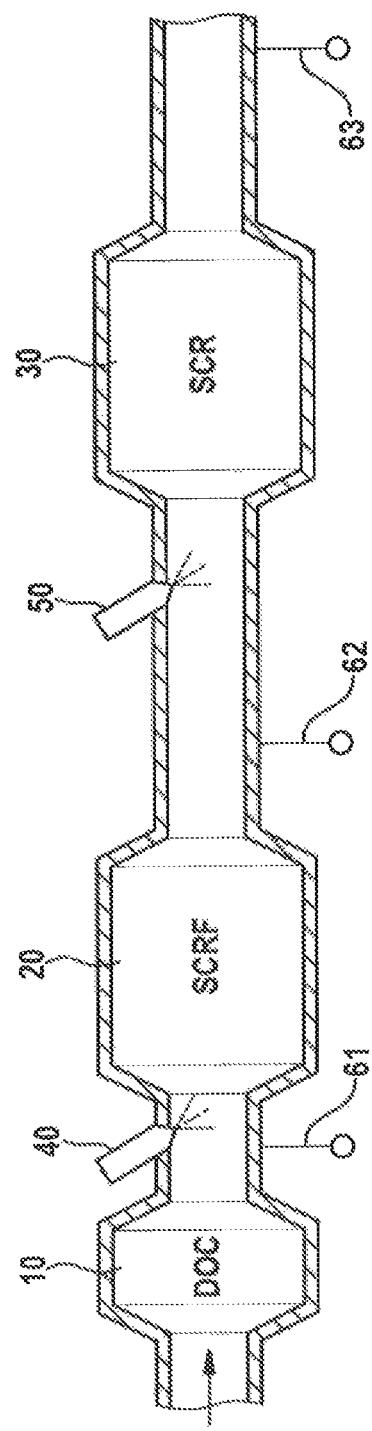
FIG. 1 is a schematic illustration of an exemplary embodiment of an SCR catalytic converter system which is suitable for carrying out the method according to the invention.

FIG. 1 schematically shows an exemplary construction of an SCR catalytic converter system which is suitable for carrying out the plausibility checking method according to the invention. The illustration shows the exhaust tract of an internal combustion engine (not shown in any more detail) through which the exhaust gas flows in the direction of the arrow. The exhaust-gas aftertreatment system comprises a diesel oxidation catalytic converter (DOC) 10. The latter is followed by an SCR-coated particle filter (SCRF) 20 as first SCR catalytic converter device. Further downstream, there is situated an SCR catalytic converter (SCR) 30 as second SCR catalytic converter device, downstream of which there may be positioned a further clean-up catalytic converter (CuC), which is not illustrated here. A first dosing point 40 for the required liquid reducing agent solution (e.g. AdBlue®) is situated between the DOC 10 and the first SCR catalytic converter device 20. The dosing point 40 is thus situated upstream of the first SCR catalytic converter device 20. A second dosing point 50 for the liquid reducing agent solution is situated downstream of the first SCR catalytic converter device 20 and at the same time upstream of the second SCR catalytic converter device 30. The dosing points 40 and 50 may involve conventional dosing devices, for example dosing valves or injectors. A first NOx sensor 61 is situated upstream of the first SCR catalytic converter device 20, and a second NOx sensor 62 is situated between the first SCR catalytic converter device 20 and the second SCR catalytic converter device 30. A third NOx sensor 63 is situated downstream of the second SCR catalytic converter device 30. Yet further sensors, for example temperature sensors, may additionally be provided. The plausibility checking method according to the invention serves for checking the plausibility of the second NOx sensor 62, which is assigned to the first SCR catalytic converter device 20, or for checking the plausibility of the NOx sensor 63 assigned to the second SCR catalytic converter device 30. The first NOx sensor 61 is not imperatively required for the plausibility checking method according to the invention. Corresponding NOx values may for example also be represented by a calculated model value.

The checking of the plausibility of the NOx sensor 62 will be discussed in more detail below. The checking of the plausibility of said NOx sensor 62 is possible in a particularly advantageous manner because, for the plausibility checking, use can be made of a phase with substoichiometric dosing that is performed in the context of an active diagnosis of the first SCR catalytic converter device 20. In this configuration of the exhaust-gas aftertreatment components, an active diagnosis with substoichiometric dosing does not lead to influences that are relevant with regard to emissions, because the increased NOx concentrations that may arise here downstream of the first SCR catalytic converter device 20 can be compensated by way of the second SCR catalytic converter device 30 with the further reducing agent dosing point 50 arranged upstream thereof. For the checking of the plausibility of the NOx sensor 62, use can thus be made of an underdosing phase during the active diagnosis of the first SCR catalytic converter device 20, wherein influencing of emissions with regard to the system as a whole can be avoided.

During the abovementioned active diagnosis in the context of a monitoring strategy, known per se, for the first SCR catalytic converter device 20, the reducing agent dosing is set so as to be substoichiometric for the conditioning phase. In the conditioning phase, the first SCR catalytic converter device 20 therefore cannot fully convert the nitrogen oxides that are formed. The maximum possible NOx conversion then corresponds to the dosing quantity ratio α. The expected NOx concentration downstream of the first SCR catalytic converter device (SCRF) 20 at the position of the NOx sensor 62 that is to be checked for plausibility thus amounts in this case, allowing for possible sensor tolerances, to the following:

$$NOx\_downstreamofSCRF = NOx\_upstreamofSCRF \cdot \alpha$$

$$\approx NOx\_upstreamofSCRF \cdot \eta\_SCRF$$

Here, η_SCRF is the NOx conversion rate of the first SCR catalytic converter device (SCRF) 20 that is expected at the present operating point. If the measured signal of the NOx sensor 62 does not correspond to the model value NOx_downstreamofSCRF calculated in this way, the measurement signal is not plausible, and a further diagnosis of the first SCR catalytic converter device 20 is, under some circumstances, no longer expedient, and may be terminated if necessary.

The plausibility checking method according to the invention may be realized through adaptation of conventional control unit software with an SCR monitoring function by virtue of the checking of the plausibility of the NOx sensor being integrated into a conditioning phase with an underdosing of reducing agent that is performed for the purposes of setting a defined starting point for the diagnosis function. It is then preferably possible for the calculation of the NOx conversion rate (efficiency calculation) of the SCR catalytic converter device to be continued only when, during the conditioning phase, the NOx signal downstream of the SCR catalytic converter device also provides meaningful values.

Figure 2:
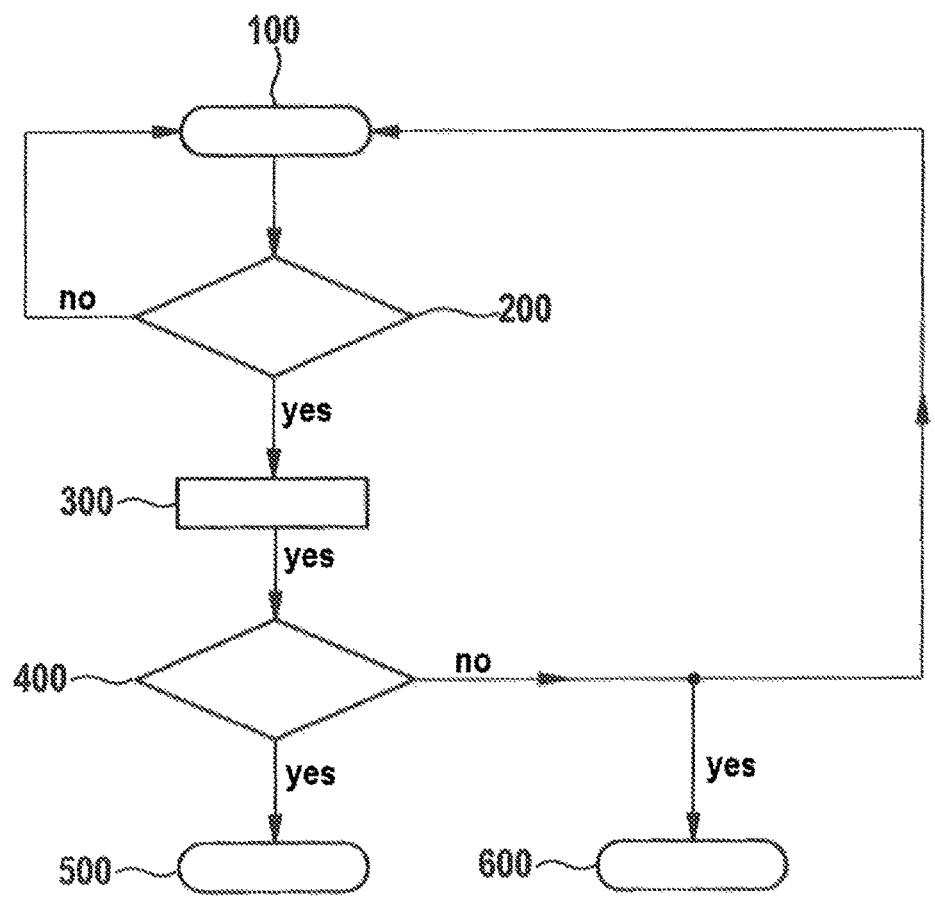
FIG. 2 shows a schematic flow diagram of an exemplary embodiment of the plausibility checking method according to the invention.

An exemplary process of an SCR diagnosis function incorporating the plausibility check according to the invention is illustrated in FIG. 2. After the start 100 of the method, it is queried in step 200 whether the SCR catalytic converter device (e.g. SCRF as first SCR catalytic converter device) whose downstream NOx sensor is to be checked for plausibility is in an optimum operating range for efficiency monitoring (SCR catalytic converter diagnosis). If this is not the case, the method returns to the start 100. If the response to the query in step 200 is positive, then the conditioning phase for the SCR catalytic converter diagnosis (active diagnosis) is started in step 300. During the conditioning phase, in which substoichiometric dosing is established, it is checked in step 400 whether the values measured by the NOx sensor that is to be checked for plausibility correspond to a model value. Here, it is in particular checked whether the relationship $$NOx\_downstreamofSCRF \approx NOx\_upstreamofSCRF \cdot \alpha$$

is satisfied. If this is the case, it is to be assumed that a plausible sensor signal is present, and the active diagnosis can be continued in a manner known per se in step 500. If the check in step 400 yields that the measured NOx signal does not correspond to the modelled or calculated NOx signal, it can be inferred that the NOx sensor signal is not plausible, and the further diagnosis of the SCR catalytic converter device can be terminated (step 600). Alternatively, it is possible for the method to return to the start 100 for the purposes of repeating the plausibility check.

The invention claimed is:

1. A method for checking the plausibility of a NOx sensor (62; 63) in an SCR catalytic converter system having at least one first SCR catalytic converter device (20) and having at least one second SCR catalytic converter device (30) and having in each case one dosing point (40, 50) for a reducing agent solution for the SCR catalytic converter devices (20, 30) upstream of the respective SCR catalytic converter device and having in each case one NOx sensor (62, 63) downstream of the SCR catalytic converter devices (20, 30), with the method comprising:

performing substoichiometric dosing of the reducing agent solution for the first SCR catalytic converter device (20) or for the second SCR catalytic converter device (30), and comparing measurable signal values of the NOx sensor (62; 63) respectively to be checked for plausibility with calculable or modellable signal values in the case of NOx conversion that is to be expected in the first SCR catalytic converter device (20) or in the second SCR catalytic converter device (30) respectively, wherein the NOx sensor (62; 63) to be checked for plausibility is situated in each case downstream of the SCR catalytic converter device (20; 30) with the substoichiometric dosing and, in the event of a deviation allowing for predefinable tolerances, determining that the respective NOx sensor (62; 63) is implausible.

2. The method according to claim 1, wherein the NOx sensor (62) to be checked for plausibility is arranged downstream of the first catalytic converter device (20) and at the same time upstream of the second SCR catalytic converter device (30), and in that the defined substoichiometric dosing of the reducing agent solution is performed at the dosing point (40) for the first SCR catalytic converter device (20), and in that the measurable signal values of the NOx sensor (62) are compared with calculable or modellable signal values in the case of NOx conversion that is to be expected in the first SCR catalytic converter device (20).

3. The method according to claim 1, wherein the defined substoichiometric dosing is a dosing quantity ratio $\alpha$, and in that the calculable or modellable signal values (NOx_downstreamofSCR1 or NOx_downstreamofSCR2 respectively) can be derived from a relationship between the dosing quantity ratio $\alpha$ and the NOx conversion rate ($\eta$_SCR1 or $\eta$_SCR2 respectively) to be expected at the present operating point of the first SCR catalytic converter device (20) or of the second SCR catalytic converter device (30) respectively.

4. The method according to claim 3, wherein the calculable or modellable signal values (NOx_downstreamofSCR1 or NOx_downstreamofSCR2 respectively) can be derived, taking into consideration measurable or modellable NOx data (NOx_upstreamofSCR1) upstream of the first SCR catalytic converter device (20) or measurable or modellable NOx data (NOx_upstreamofSCR2) upstream of the second SCR catalytic converter device (30) respectively, from the following relationship:

NOx_downstreamofSCR1=
    NOx_upstreamofSCR1·$\alpha$≈NOx_upstreamofSCR1·$\eta$_SCR1 or

NOx_downstreamofSCR2=
    NOx_upstreamofSCR2·$\alpha$≈NOx_upstreamofSCR2·$\eta$_SCR2 respectively.

5. The method according to claim 1, wherein checking of the plausibility of the NOx sensor (62; 63) is performed as part of a monitoring function for the $NH_3$ storage capacity of the first SCR catalytic converter device (20) or of the second SCR catalytic converter device (30) respectively.

6. The method according to claim 5, wherein the monitoring function for the $NH_3$ storage capacity is terminated if it can be detected that the NOx sensor (62; 63) is implausible.

7. The method according to claim 5, wherein the monitoring function for the $NH_3$ storage capacity comprises the following phases:

a conditioning phase with substoichiometric dosing for the purposes of setting a defined working point of the first SCR catalytic converter device (20) or of the second SCR catalytic converter device (30) respectively, an overdosing phase until the maximum $NH_3$ storage of the first SCR catalytic converter device (20) or of the second SCR catalytic converter device (30) respectively is reached, a possible emptying phase with dosing reduced or stopped, and an analysis phase of the NOx conversion rate for the purposes of checking the $NH_3$ storage capacity, wherein checking of the plausibility of the NOx sensor (62; 63) is performed during the conditioning phase.

8. The method according to claim 1, wherein the first SCR catalytic converter device (20) is a particle filter with SCR coating, and in that the second SCR catalytic converter device (30) is a conventional SCR catalytic converter.

9. The method according to claim 1, wherein, before the plausibility check, it is checked whether operating conditions suitable for a plausibility check are present.

10. The method according to claim 1, wherein the NOx sensor (63) to be checked for plausibility is arranged downstream of the second SCR catalytic converter device (30), and in that the measurable signal values of the NOx sensor (63) are compared with calculable or modellable signal values in the case of NOx conversion that is to be expected in the second SCR catalytic converter device (30), wherein the first SCR catalytic converter device (20) is operated in an operating mode with normal closed-loop control, and in that the defined substoichiometric dosing of the reducing agent solution is performed at the dosing point (50) for the second SCR catalytic converter device (30) by virtue of the dosing being stopped, wherein the calculable or modellable signal values (NOx_downstreamofSCR2) can be derived from the following relationship:

NOx_downstreamofSCR2=NOx_downstreamofSCR1

11. An electronic control unit programmed with instructions that, when executed, carry out the steps of a method according to claim 1.

12. A non-transitory machine-readable storage medium containing computer-readable instructions, which when executed by a computer, cause an SCR catalytic converter system having at least one first SCR catalytic converter device (20) and having at least one second SCR catalytic converter device (30) and having in each case one dosing point (40, 50) for a reducing agent solution for the SCR catalytic converter devices (20, 30) upstream of the respective SCR catalytic converter device and having in each case one NOx sensor (62, 63) downstream of the SCR catalytic converter devices (20, 30), to:

perform substoichiometric dosing of the reducing agent solution for the first SCR catalytic converter device (20) or for the second SCR catalytic converter device (30), and compare measurable signal values of the NOx sensor (62; 63) respectively to be checked for plausibility with calculable or modellable signal values in the case of NOx conversion that is to be expected in the first SCR catalytic converter device (20) or in the second SCR catalytic converter device (30) respectively, wherein the NOx sensor (62; 63) to be checked for plausibility is situated in each case downstream of the SCR catalytic converter device (20; 30) with the substoichiometric dosing and, in the event of a deviation allowing for predefinable tolerances, determine that the respective NOx sensor (62; 63) is implausible.

* * * * *